(12) United States Patent
Tooker et al.

(10) Patent No.: US 10,807,445 B2
(45) Date of Patent: Oct. 20, 2020

(54) VEHICLE WINDOW ASSEMBLY WITH LOUVERED WINDOW

(71) Applicant: MAGNA MIRRORS OF AMERICA, INC., Holland, MI (US)

(72) Inventors: Troy F. Tooker, Allegan, MI (US); David K. Johnson, Holland, MI (US); Julie L. Quinones, Dearborn, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 426 days.

(21) Appl. No.: 15/354,005

(22) Filed: Nov. 17, 2016

(65) Prior Publication Data

US 2017/0066305 A1  Mar. 9, 2017

Related U.S. Application Data

(63) Continuation-in-part of application No. 14/107,623, filed on Dec. 16, 2013.

(60) Provisional application No. 62/258,720, filed on Nov. 23, 2015, provisional application No. 61/839,583, filed on Jun. 26, 2013, provisional application No. 61/738,095, filed on Dec. 17, 2012.

(51) Int. Cl.
  *B60J 1/10* (2006.01)
  *B32B 17/10* (2006.01)
  *B60J 10/70* (2016.01)

(52) U.S. Cl.
  CPC ........... *B60J 1/10* (2013.01); *B32B 17/10018* (2013.01); *B32B 17/10779* (2013.01); *B60J 10/70* (2016.02); *B32B 2307/402* (2013.01); *B32B 2307/41* (2013.01); *B32B 2605/08* (2013.01)

(58) Field of Classification Search
  CPC .............. Y10T 428/16; Y10T 428/161; B32B 17/10018; B32B 17/10779; B32B 2307/402; B32B 2307/41; B32B 2605/006; B32B 2605/08; B60J 1/10; B60J 10/70
  See application file for complete search history.

(56) References Cited

U.S. PATENT DOCUMENTS 2,061,760 A   11/1936  Fisher
3,843,982 A   10/1974  Lane
(Continued)

FOREIGN PATENT DOCUMENTS

JP   2001071752 A  *  3/2001  ............. B60J 10/78
JP   2004071752        3/2001

OTHER PUBLICATIONS

English translation from JPlatPat of JP 2001-071752 to Nakano, provided by Applicant (Year: 2001).*

*Primary Examiner* — Frank J Vineis
*Assistant Examiner* — Laura B Figg
(74) *Attorney, Agent, or Firm* — Honigman LLP

(57) ABSTRACT

A window assembly for a vehicle includes a plurality of window panels arranged with at least one pair of adjacent window panels. Adjacent edge portions of the adjacent window panels are joined by a respective molded joining element. The molded joining element is at least partially overmolded and joined at the respective edge portions of the adjacent window panels. The adjacent edge portions joined by the respective molded joining element are offset or non-coplanar. The window panels are formed such that the adjacent edge portions and the molded joining element provide a selected pattern.

26 Claims, 22 Drawing Sheets

(56) References Cited

U.S. PATENT DOCUMENTS

| | | | | |
|---|---|---|---|---|
| 4,043,586 | A | * | 8/1977 | Hafer .................. B60J 1/10 296/96.21 |
| 4,712,287 | A | * | 12/1987 | Johnston ............. B60J 1/008 29/458 |
| 4,943,466 | A | * | 7/1990 | Bareich ............... B60J 10/75 428/122 |
| 5,060,440 | A | * | 10/1991 | Weaver ............... B60J 1/02 52/204.597 |
| 5,154,028 | A | * | 10/1992 | Hill .................... B60J 10/248 296/201 |
| 5,542,214 | A | * | 8/1996 | Buening .............. B60J 1/16 49/127 |
| 5,551,197 | A | | 9/1996 | Repp et al. |
| 5,799,444 | A | * | 9/1998 | Freimark ............. B60J 1/1853 49/209 |
| 5,853,895 | A | | 12/1998 | Lewno |
| 6,691,464 | B2 | | 2/2004 | Nestell et al. |
| 7,003,916 | B2 | | 2/2006 | Nestell et al. |
| 7,073,293 | B2 | | 7/2006 | Galer |
| 8,276,409 | B2 | | 10/2012 | Tooker et al. |
| 8,402,695 | B2 | | 3/2013 | Smith et al. |
| 8,881,458 | B2 | | 11/2014 | Snider et al. |
| 2003/0075947 | A1 | | 4/2003 | Fujiwara |
| 2003/0213179 | A1 | | 11/2003 | Galer |
| 2004/0020131 | A1 | | 2/2004 | Galer |
| 2004/0035066 | A1 | * | 2/2004 | Leconte ............... B60J 10/70 52/204.591 |
| 2006/0107600 | A1 | | 5/2006 | Nestell et al. |
| 2008/0127563 | A1 | | 6/2008 | Tooker et al. |
| 2010/0107497 | A1 | | 5/2010 | Hulst et al. |
| 2014/0141194 | A1 | | 5/2014 | Lynam |
| 2014/0170357 | A1 | * | 6/2014 | Tooker ................ B60J 1/10 428/38 |
| 2015/0101254 | A1 | | 4/2015 | Tooker et al. |

* cited by examiner

VEHICLE WINDOW ASSEMBLY WITH LOUVERED WINDOW

CROSS REFERENCE TO RELATED APPLICATIONS

The present application claims priority of U.S. provisional application Ser. No. 62/258,720, filed Nov. 23, 2015, which is hereby incorporated herein by reference in its entirety. The present application is also a continuation-in-part of U.S. patent application Ser. No. 14/107,623, filed Dec. 16, 2013 and published Jun. 19, 2014 as U.S. Publication No. US-2014-0170357, which claims the filing benefits of U.S. provisional applications, Ser. No. 61/839,583, filed Jun. 26, 2013, and Ser. No. 61/738,095, filed Dec. 17, 2012, which are hereby incorporated herein by reference in their entireties.

FIELD OF THE INVENTION

The present invention relates to window assemblies for vehicles and, more particularly to a side or rear fixed window assembly for a vehicle.

BACKGROUND OF THE INVENTION

It is known to provide a window assembly for an opening of a vehicle, such as a side window assembly for a side opening of a vehicle. Conventional side openings of sports cars or the like may have a louvers or spaced apart body panels established at the vehicle body and outside of a fixed window panel, with the louvered panels comprising an opaque metal or plastic.

SUMMARY OF THE INVENTION

The present invention provides a vehicle louvered window assembly that comprises a plurality of glass panels that encapsulated or partially encapsulated along their peripheries with adjacent perimeter edge regions joined together by respective encapsulation portions or ribs. The glass panels are preferably louvered or offset or non-coplanar at their adjacent perimeter edges and held in such a configuration via the partial encapsulation of the perimeter edge portions or regions of adjacent panels.

According to an aspect of the present invention, a window assembly for a vehicle comprises a plurality of window panels arranged with at least one pair of adjacent window panels, with adjacent edge portions of adjacent ones of the window panels being joined by a respective molded joining element. The adjacent edge portions joined by a respective molded joining element are offset or non-coplanar.

The window panels may comprise glass window panels, and the window assembly may comprise a side or rear or top window of a vehicle. The molded joining element may comprise an encapsulation that at least partially receives a perimeter edge portion of at least one of the adjacent window panels.

For example, the adjacent window panels may comprise first and second window panels for a side window assembly of a vehicle, with the second window panel disposed rearward of the first window panel. The molded joining element partially receives a rear perimeter edge portion of the first window panel and does not overlap an outer surface of the first window panel, and the molded joining element at least partially receives a front perimeter edge portion of the second window panel. An outer surface of the first window panel at or near the rear perimeter edge portion is non-coplanar with an outer surface of the second window panel at or near the front perimeter edge portion.

Optionally, the first and second window panels may be formed or cut to any desired shape and may be offset and/or overlapped to provide any desired pattern for the two-panel window assembly. The forming and arrangement of the offset/overlapping window panels may be selected depending on the particular application of the window assembly and the exterior vehicle design. Optionally, the molded joining element may be colored or patterned to provide an enhanced appearance of the window assembly, such as colored to match or coordinate with a color scheme of the particular vehicle application of the window assembly.

These and other objects, advantages, purposes and features of the present invention will become apparent upon review of the following specification in conjunction with the drawings.

DESCRIPTION OF THE PREFERRED EMBODIMENTS

Figure 1:
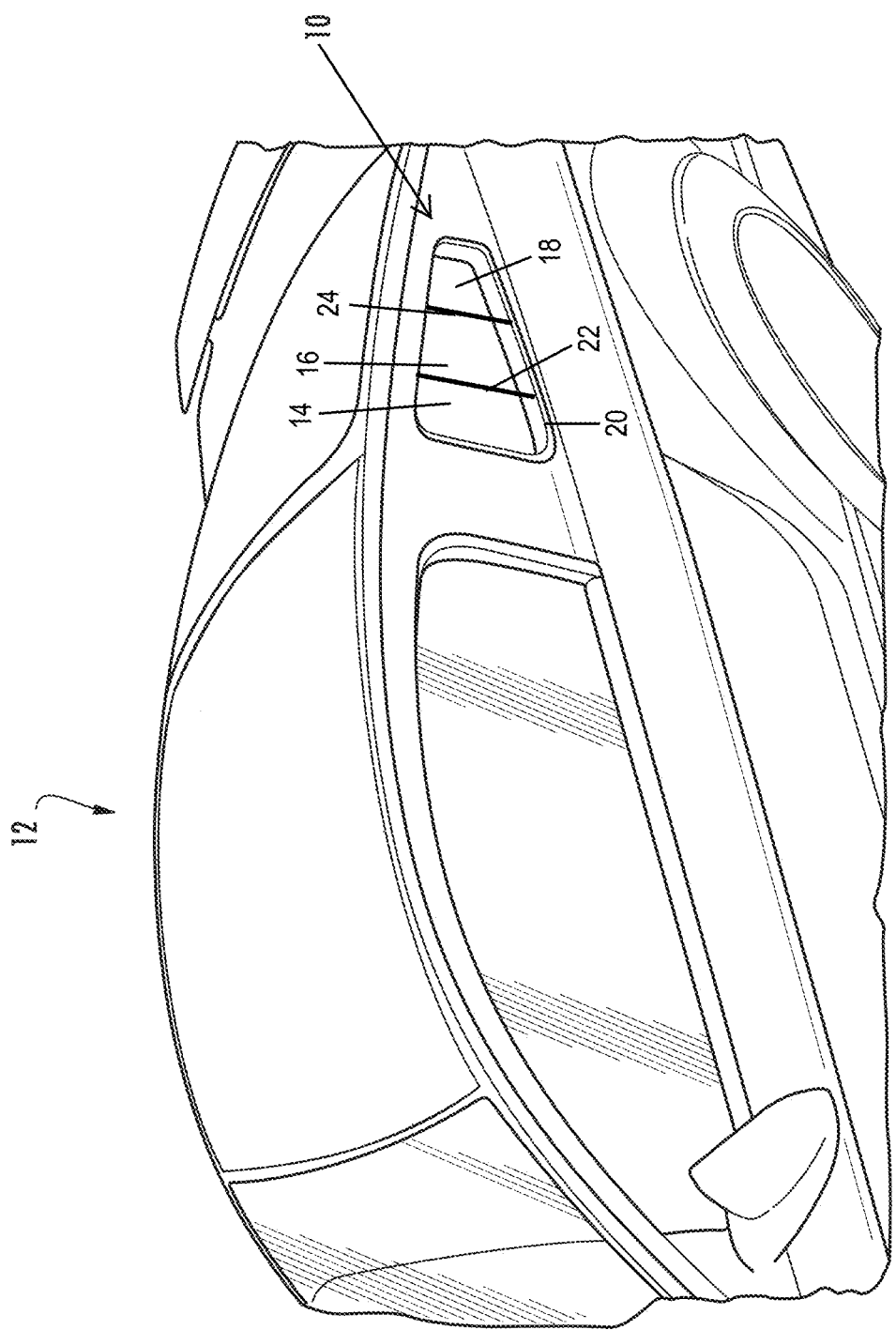
FIG. 1 is a perspective view of a vehicle having a window assembly in accordance with the present invention.

Referring now to the drawings and the illustrative embodiments depicted therein, a window assembly 10 of a vehicle 12 comprises a plurality of glass window panels 14, 16, 18 that are louvered or non-coplanar. The glass window panels 14, 16, 18 are disposed at a perimeter frame or encapsulation 20 and have an encapsulation portion or rib 22 at and between and adjoining panels 14 and 16 and an encapsulation portion or rib 24 at and between and adjoining panels 16 and 18. The window assembly 10 provides a louvered window assembly that is suitable for use as a side window or rear window of a sports car or the like (such as a small fixed side rear window of a vehicle or a rear window of a hatchback vehicle or the like). The louvered window assembly provides a plurality of separated and louvered transparent window panels (and optionally the window panels may be tinted or darkened or otherwise made less light transmitting or even substantially non-light transmitting, depending on the particular application of the window assembly), with the separate window panels being joined together via encapsulation portions or ribs and a peripheral encapsulation, such that the separate window panels are joined or fixed relative to one another and do not move or open or pivot or slide relative to one another.

Figure 4:
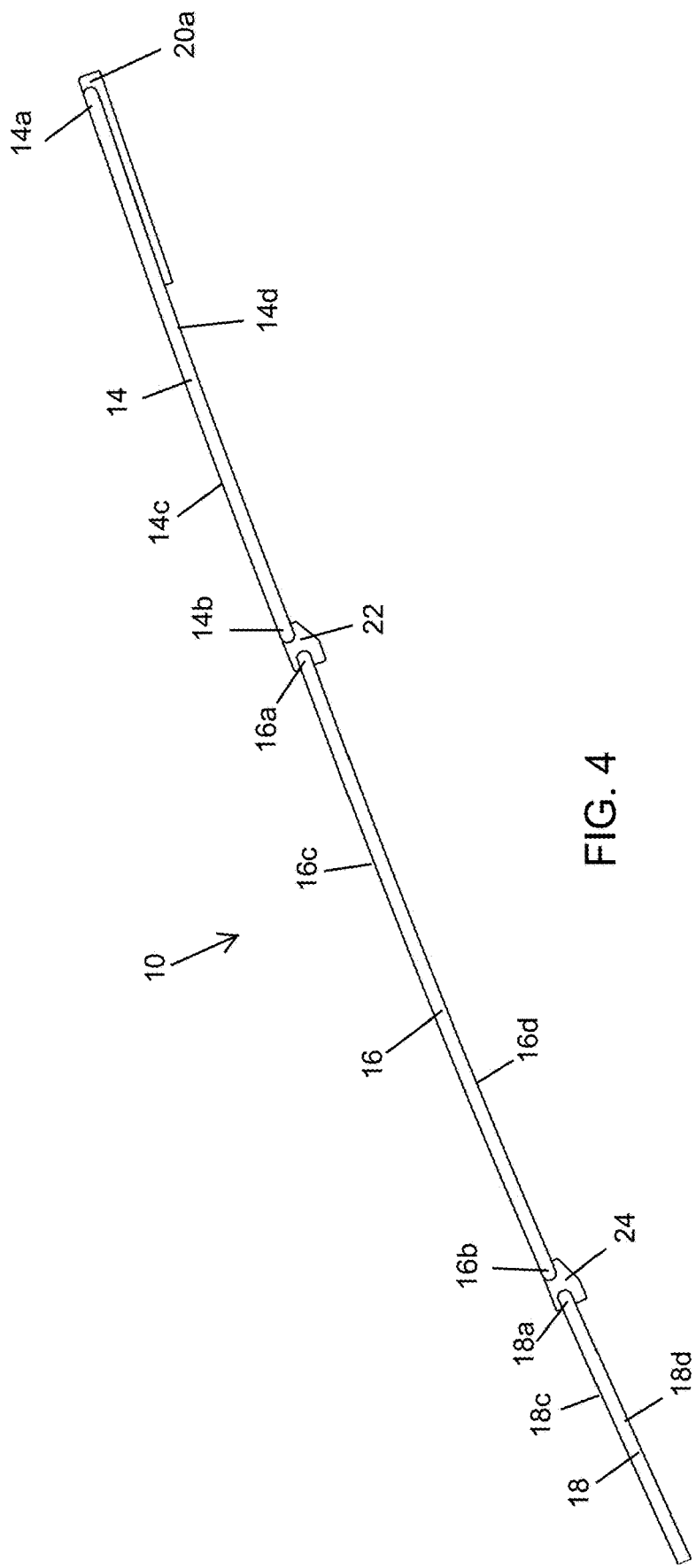
FIG. 4 is a sectional view of the vehicular window assembly taken along the line A-A in FIG. 2.
Figure 5:
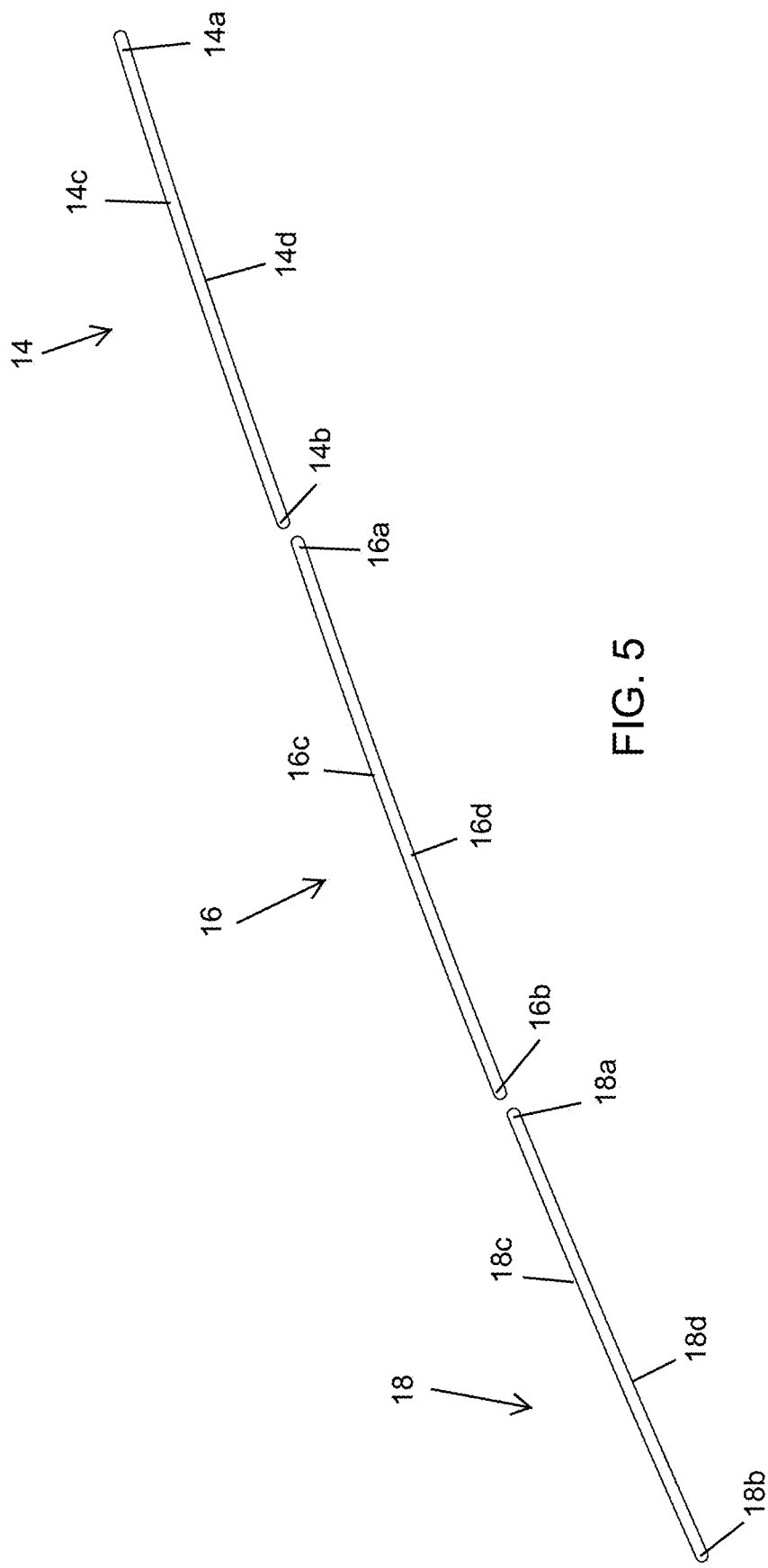
FIG. 5 is a sectional view of the glass panels of FIG. 3, shown without the encapsulations or ribs.

As best seen with reference to FIGS. 2-5, the window panels 14, 16, 18 are louvered or non-coplanar. For example, and as shown in FIGS. 4 and 5, a rearward perimeter portion 14b of forwardmost window panel 14 is outboard of a forward perimeter portion 16a of middle window panel 16, while a rearward perimeter portion 16b of middle window panel 16 is outboard of a forward perimeter portion 18a of rearwardmost window panel 18. The adjoining or adjacent perimeter edges 14b, 16a and 16b, 18a are joined via the respective encapsulation portion or rib 22, 24. In the illustrated embodiment, and as best shown in FIG. 4, encapsulation 22 at least partially receives rear perimeter edge 14b therein and at least partially receives front perimeter edge 16a, while encapsulation 24 at least partially receives rear perimeter edge 16b therein and at least partially receives front perimeter edge 18a. The encapsulations 22, 24 are disposed at the rearward perimeter edges 14b, 16b, respectively, so that the encapsulation does not encompass the outer surface 14c, 16c of the window panel, such that the encapsulation 22, 24 may provide a generally flush configuration at the outer surface 14c, 16c of the respective window panel 14, 16 (with an outer surface of the encapsulation 22 being generally coplanar with the outer surface of the window panel 14 and an outer surface 14c of the encapsulation 24 being generally coplanar with the outer surface 16c of the window panel 16). The encapsulation may be overmolded onto the perimeter edge portions of the glass panels or otherwise bonded at the perimeter edge portions of the glass panels. The encapsulation, when overmolded or bonded at the perimeter edge portions of the adjacent panels, is fixedly attached at the perimeter edge portions such that the panels do not move (such as open or pivot or slide) relative to the encapsulation and/or the other adjacent panel or panels.

Figure 2:
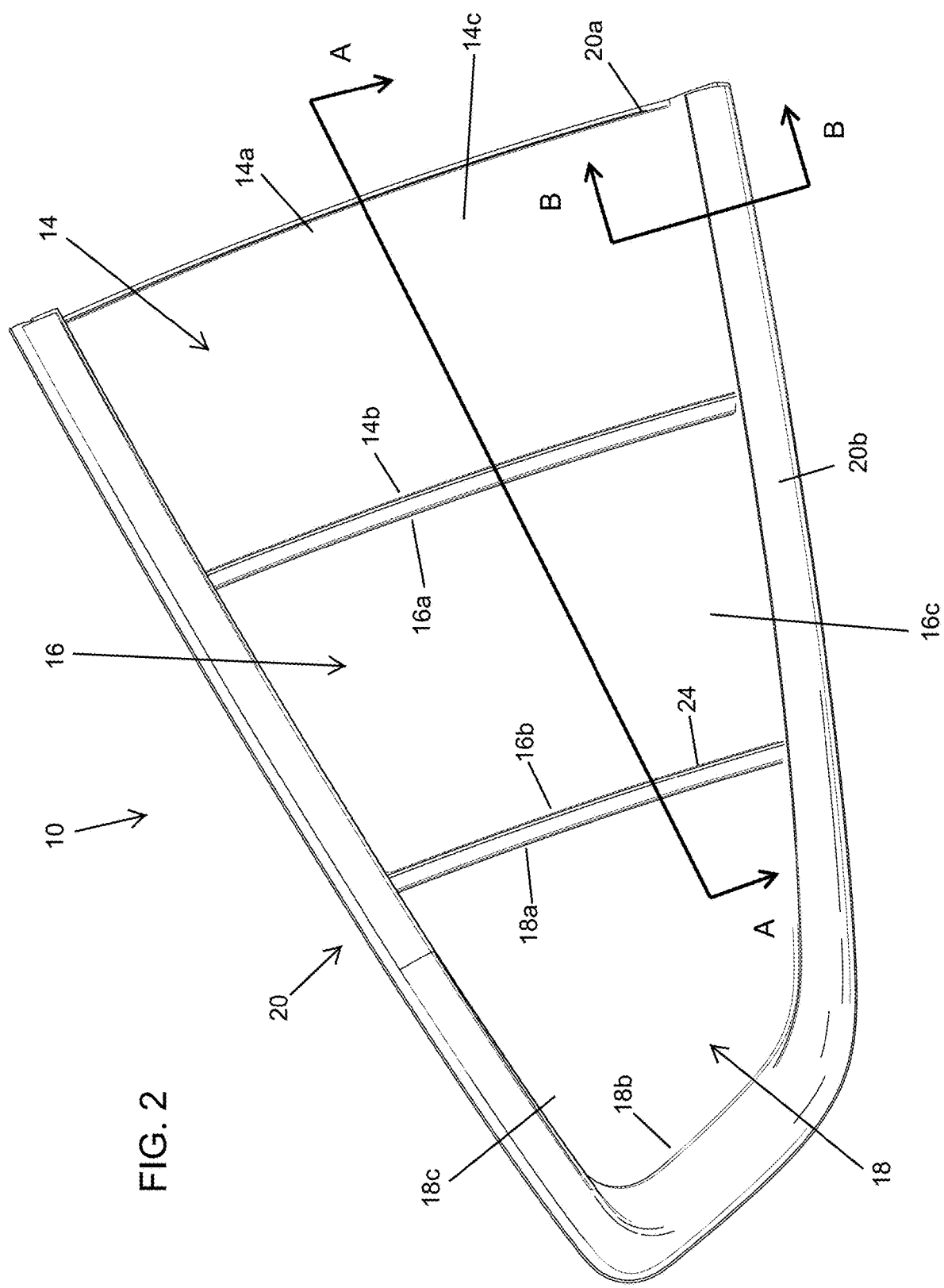
FIG. 2 is a side elevation of a vehicular window assembly of the present invention.
Figure 3:
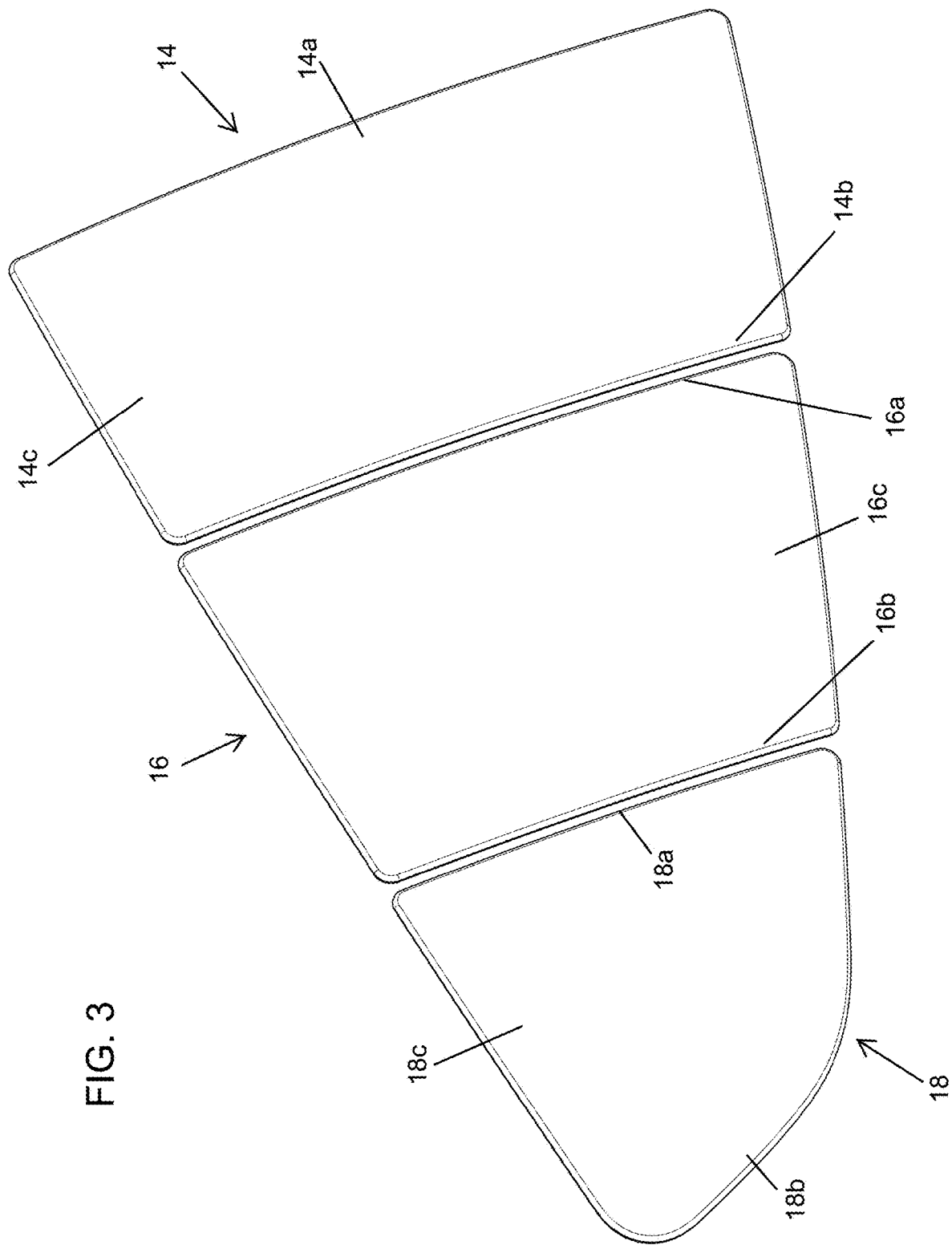
FIG. 3 is a side elevation of the glass panels of the vehicular window assembly of FIG. 2.

Optionally, an outer frame or encapsulation 20 may be provided about and along the outer perimeters of the glass panels. As shown in FIG. 2, the frame 20 may include a forward frame portion 20a that is disposed at the forward perimeter edge region 14a of forward window panel 14 and a perimeter molding or frame portion 20b that is disposed at the upper and lower perimeter edge regions or portions of the window panels and at the rear perimeter edge region or portion 18b of rear window panel 18, whereby the forward frame portion 20a and the perimeter frame portion 20b substantially circumscribe the window panels. As shown in FIG. 4, the forward frame portion 20a may be molded or established at the inner surface 14d of the forward window panel 14 and may at least partially receive the forward perimeter edge 14a therein (and may not overlap the outer surface 14c of the window panel 14 so as to provide a generally flush configuration of the frame portion at the outer surface of the window panel).

Figure 6:
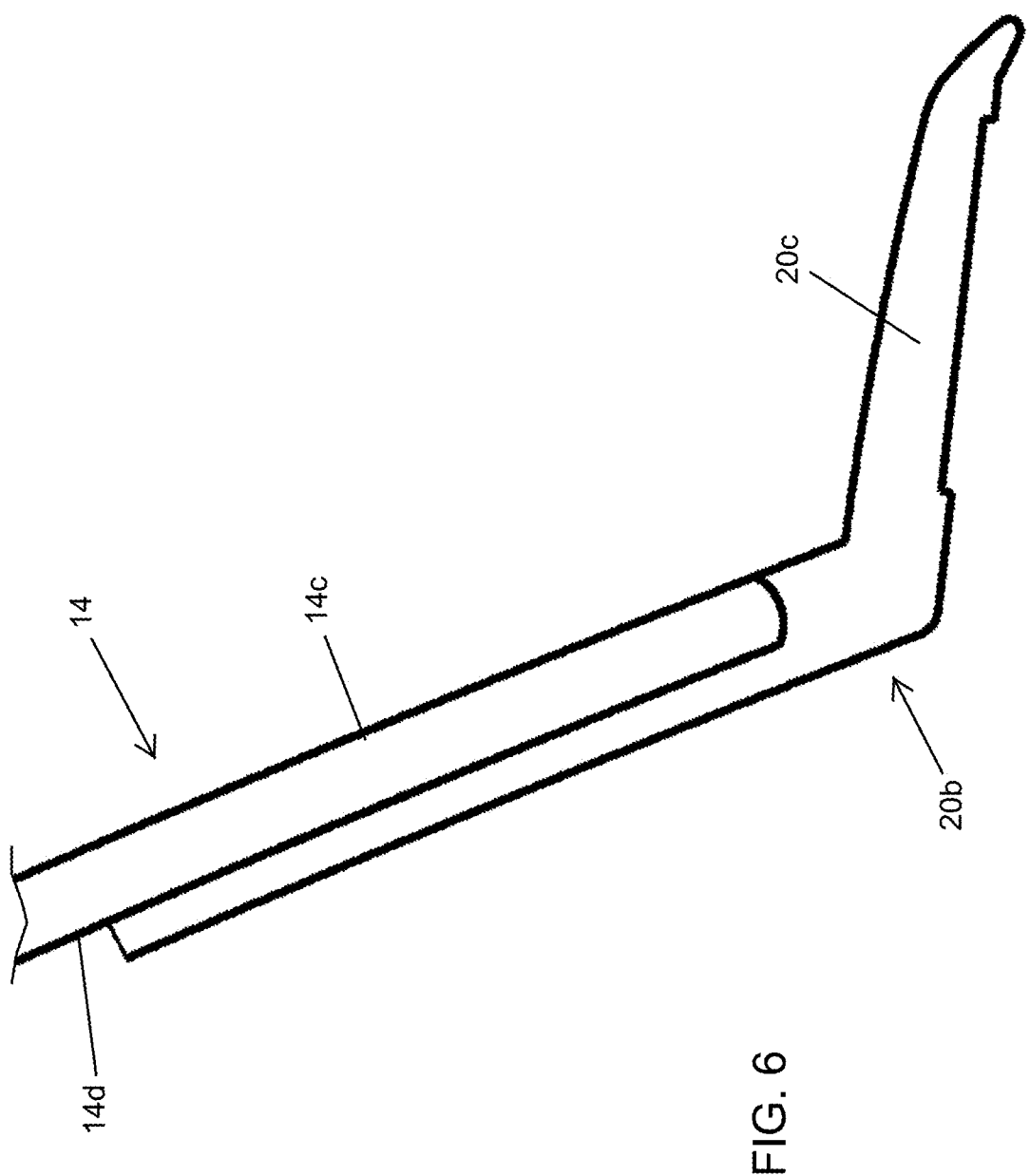
FIG. 6 is a sectional view of the vehicular window assembly taken along the line B-B in FIG. 2.

The perimeter frame portion 20b, and such as shown in FIG. 6, may also be molded or established at the inner surfaces (inner surface 14d of forward window panel 14 is shown in FIG. 6, but the frame would be established at the inner surfaces 16d, 18d of the other window panels 16, 18 in a similar manner) and may at least partially receive the perimeter edges therein (and may not overlap the outer surfaces of the window panels so as to provide a generally flush configuration of the frame portion at the outer surfaces of the window panels). The perimeter frame portion 20b may include a flange or seal 20c that extends or protrudes outwardly around the window panel, such as for mounting and/or sealing the window assembly 10 at the body of the vehicle.

The encapsulations or frame portions may comprise any suitable materials, and may be formed or molded out of a plastic or polymeric material (such as a polycarbonate or an ABS or PET material) or the like. The frame portions may be molded over and around the perimeter edges and perimeter regions of the inner surfaces of the glass panels so as to receive or encompass the perimeter edges and to secure the frame portion at the perimeter edges of the glass panels. For example, the glass panels may be placed in a mold cavity, where the perimeter frame and/or encapsulations are molded over (such as via injection molding or the like) and around and along the perimeter edge regions of the glass panels and between the adjacent edge regions of the glass panels to encapsulate the perimeter edges of the glass panels and the periphery of the joined glass panels. Optionally, the frame portion may be adhesively bonded to the perimeter edges of the glass panel and may be bonded at the inner surface of the glass panel (and optionally may overlap or encompass the outer surface of the glass panel and may be bonded at the inner surface of the glass panel), such as by utilizing aspects of the window assemblies described in U.S. Pat. Nos. 5,853,895 and/or 5,551,197, which are hereby incorporated herein by reference in their entireties.

The window panels may comprise glass window panels, such as transparent tempered glass window panels or the like. Optionally, the window panels may comprise a non-glass material, such as a transparent or substantially transparent plastic or polymeric or acrylic material or the like. Optionally, the window panels may be molded and the molding may include the ribs and/or frame portions to provide a unitary construction of the window assembly. Although shown and described as a small fixed side window (having three window panels) for a vehicle, clearly, the window assembly of the present invention may have two or three or four or more louvered window panels such as described above and may be suitable for a larger fixed side window and/or a rear window (such as a liftgate window such as for a hatchback vehicle or the like) or a top window, such as a sunroof or moonroof or the like.

Optionally, an opaque coating or frit layer may be established at the perimeter regions of the glass panels to substantially conceal or hide the portions of the frame and encapsulations or ribs that are disposed at the rear surface of the window panels. Optionally, the frit or paint or ink layer or coating may be disposed or screened onto a surfaces of the glass panels after forming the glass panels. In applications where an opaque or non-transparent frit layer or other pattern or the like may be disposed at the surface of the glass panels, the adhesive may comprise a substantially non-transparent adhesive. The opaque layer or frit layer may comprise a ceramic frit layer and may function to facilitate adhering or bonding of the perimeter frame (and optionally any hardware elements or brackets or hinges or the like) to the glass panels. The frit layer may be substantially opaque, and thus may improve the overall appearance of the window assembly, since the bonding surfaces are not readily discernible or viewable through the glass panels and the frit layer. Examples of such frit layers are described in U.S. Pat. Nos. 5,853,895 and/or 5,551,197, incorporated above. The frit layer may be disposed onto the surfaces of the glass panels in any desired pattern, such as stripes, dots, wave pattern or the like, to provide the desired appearance to the window panels, depending on the particular application of the window assembly.

Figure 7:
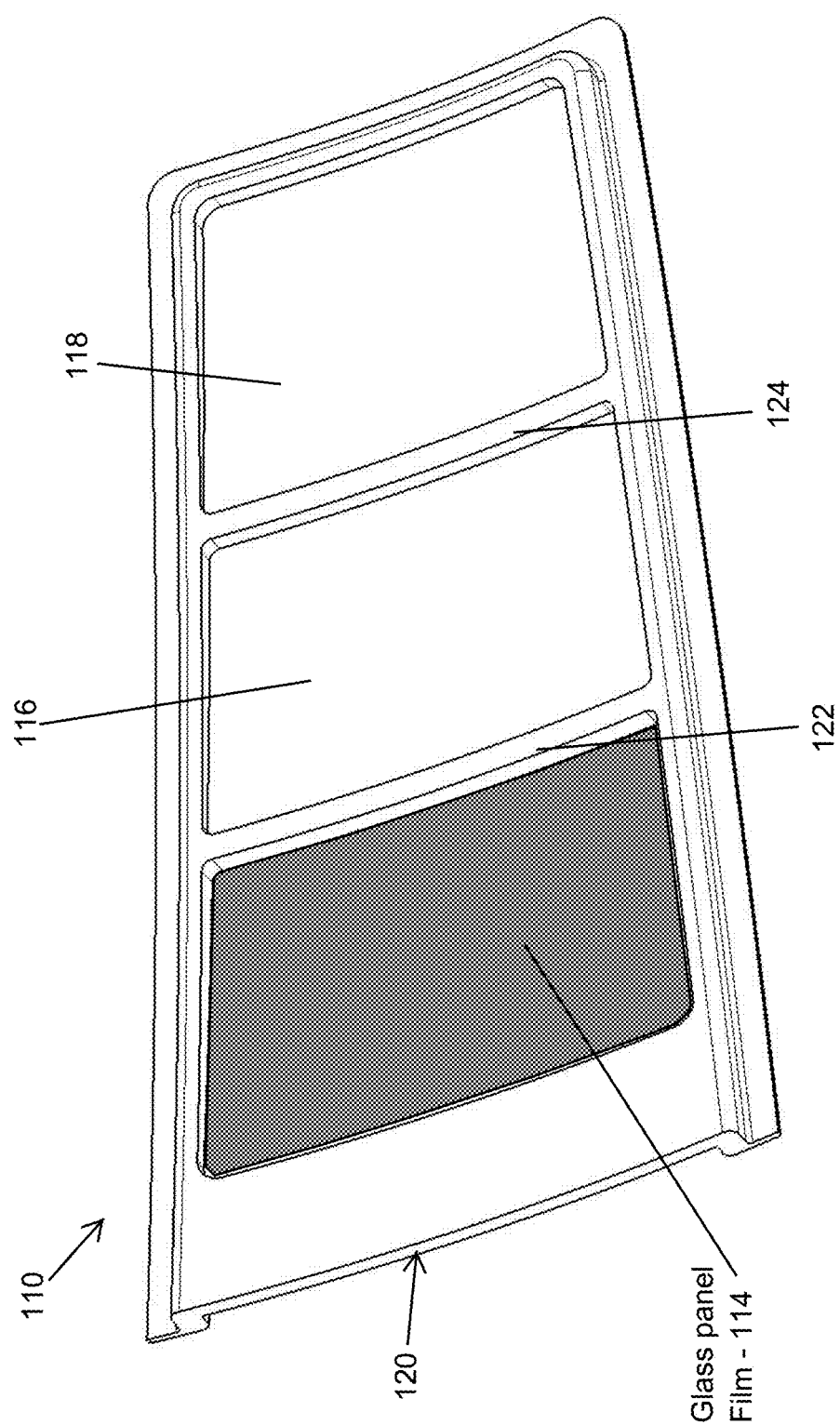
FIG. 7 is a perspective view of another vehicular window assembly of the present invention, with an opaque film established at a window panel of the window assembly.
Figure 8:
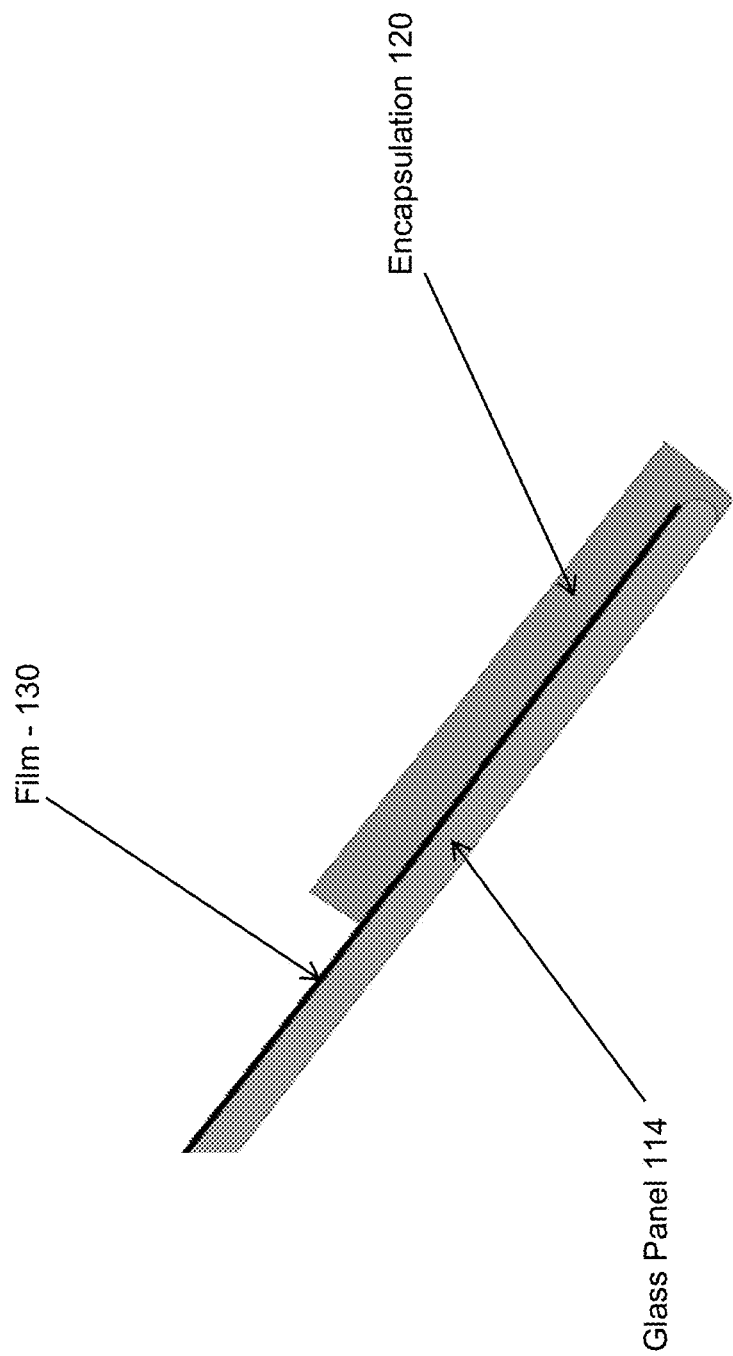
FIG. 8 is a sectional view of the window assembly of FIG. 7, showing the film at the window panel and between the encapsulation and the window panel.

Optionally, an opaque or patterned or colored film may be adhered or bonded or established at the surface of one or more of the window panels of the louvered window assembly to provide the desired opaqueness and appearance to the window assembly. For example, and with reference to FIGS. 7-9, a vehicular window assembly 110 comprises a plurality of glass window panels 114, 116, 118 that are louvered or non-coplanar, with at least one of the window panels (such as window panel 114 in the illustrated embodiment) having an opaque film 130 established at a surface thereof. The glass window panels 114, 116, 118 are disposed at a perimeter frame or encapsulation 120 and have an encapsulation portion or rib 122 at and between and adjoining panels 114 and 116 and an encapsulation portion or rib 124 at and between and adjoining panels 116 and 118. The ribs 122, 124 may be integrally formed or molded with the frame portion 120 to provide an encapsulation that captures or encapsulates the perimeter edges of each of the window panels 114, 116, 118, such as in a similar manner as discussed above.

Figure 9:
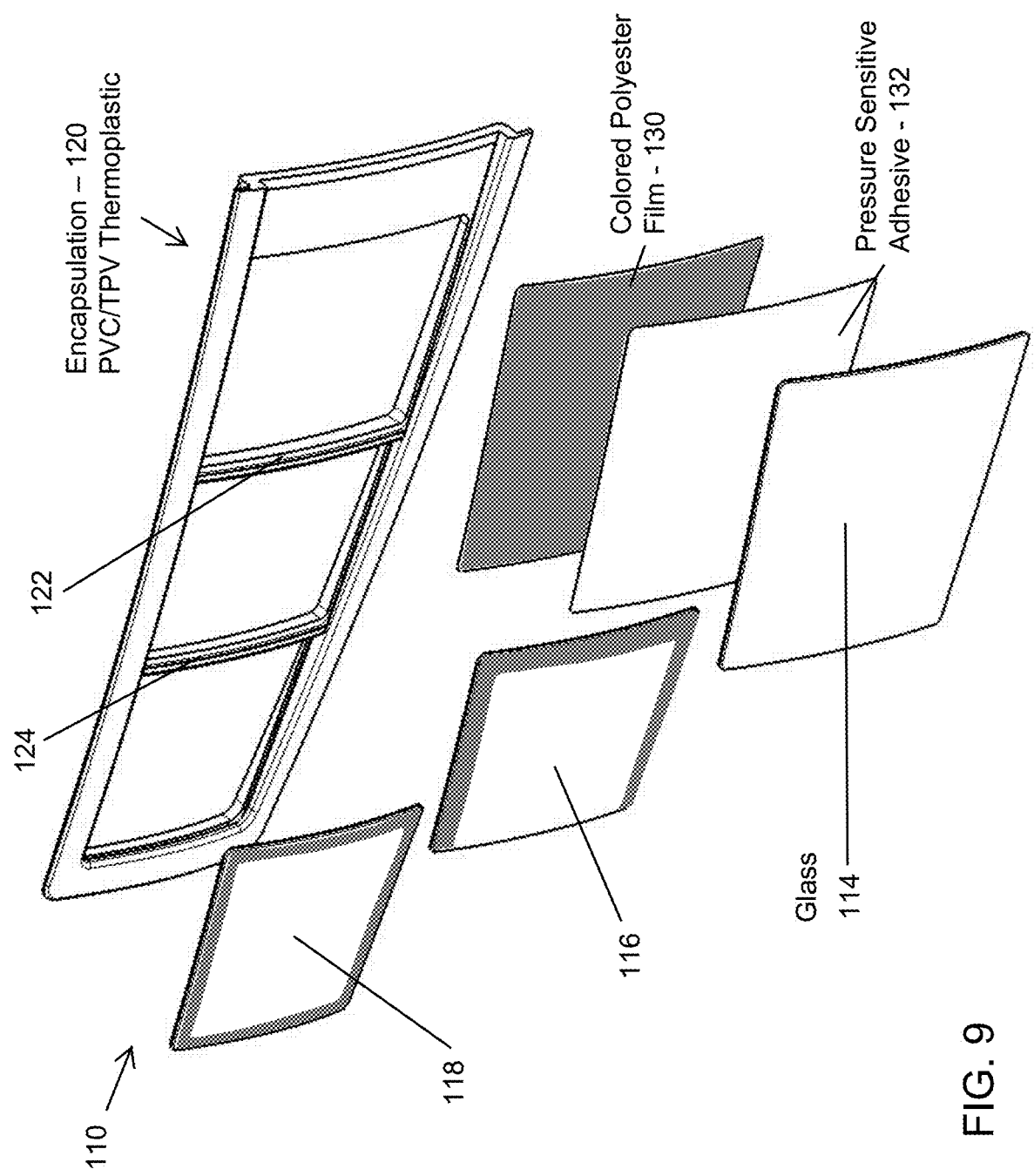
FIG. 9 is an exploded perspective view of the window assembly of FIG. 7.
Figure 10:
FIGS. 10-19 are perspective views of other louvered or multi-pane encapsulated window assemblies of the present invention.
Figure 11:
Figure 12:
Figure 13:

As shown in FIG. 9, the film 130 (such as a colored or tinted or darkened polyester film or the like) is bonded or adhered at the interior surface of the window panel 114 via an adhesive layer 132, such as a pressure sensitive adhesive or the like. Optionally, and desirably, the film is adhered or attached at the window panel surface before the encapsulation 120 is molded over and along the panel edges and between the window panels so as to achieve a frit-like appearance for the window assembly. The film 130 may comprise any suitable film or layer or sheet, such as an opaque or colored film or such as a patterned film or the like. Optionally, for example, the film may comprise a PET film or the like, and/or may comprise, for example, a Black Out-X film commercially available from Madico, Inc. of Woburn, Mass. Optionally, one of the window panels (such as leading panel 114 in the illustrated embodiment) may have the film 130 disposed over substantially its entire surface and one or more of the other window panels may have a film or frit layer established about and along their perimeter regions. The film 130 provides a frit-like appearance to the film-covered window panel without having to establish a frit layer over the entire surface of the window panel.

After the film is adhered or bonded or affixed at the surface of the window panel, the window panels (including the film-coated window panel) may be disposed in a molding cavity (or cavities) and the encapsulation may be molded around and along the perimeter edges of the window panels with the ribs 122, 124 formed or molded between the respective adjacent window panels. As can be seen with reference to FIG. 8, the film 130 and encapsulation 120 are configured or established such that the encapsulation 120 overlaps or overlays at least a portion of the film 130 along the perimeter region of the window panel surface so that, to an observer viewing the window panel, the film has the appearance of a frit material or coating that at least substantially covers or encompasses the window panel surface. Optionally, a portion of the film may be patterned or may include a logo or icon or text or images or the like, to provide the desired appearance at the window panel or panels. Optionally, the encapsulation may be overmolded onto the perimeter edge portions of the glass panels or may otherwise bonded at the perimeter edge portions of the glass panels.

Thus, the present invention provides a louvered window assembly for a vehicle. The perimeter frame portion or encapsulation may be established along and around the perimeter edge regions of the glass panels and between and adjoining adjacent perimeter edge regions of adjacent glass panels. Optionally, the encapsulations may be molded over and around the perimeter edge regions of the glass panels or may be bonded along the perimeter edge regions of the glass panels. Optionally, the encapsulations may encompass the perimeter regions of the inner surfaces of the glass panels and the perimeter edges of the glass panels, with the outer surfaces of the glass panels being exposed. Optionally, the louvered window panels may partially overlap one another (such as the rear perimeter region of the forward window panel overlapping the forward perimeter region of the adjacent middle or rearward window panel), with the respective encapsulation disposed between the inner and outer surfaces of the overlapping portions of the window panels, while remaining within the spirit and scope of the present invention. The perimeter edge region of the outer overlapping window panel thus may have a frameless appearance with the cut or rounded or ground glass perimeter edge of the window panel being substantially or entirely exposed.

The window panels are arranged in any desired or suitable pattern to provide the desired or selected appearance of the window assembly and the vehicle at which it is mounted. For example, the window panels may be arranged with generally straight (or slightly curved) and generally parallel adjacent edge portions and joining elements, such as discussed above. Optionally, the window panels may be formed and arranged (with a portion of at least one panel offset from and/or overlapping a portion of at least one other panel) in any other decorative arrangement or pattern depending on the particular application of the window assembly and desired appearance for the vehicle. The offset and/or overlapping portions of the panels may be joined via a joining element or encapsulation as described above.

Figure 14:
Figure 15:
Figure 16:
Figure 17:
Figure 18:
Figure 19:

For example, the window assembly may comprise two or more louvered panels in various angled configurations, such as shown in FIGS. 10-13. The louvered panels may comprise only one outboard panel and one inboard panel with either a straight joining encapsulation or interface (FIG. 13) or an angled or curved or bent joining encapsulation or interface (FIG. 14), where the adjacent edge portions of adjacent window panels are corresponding formed and the joining element or encapsulation is molded along the adjacent edge portions to join the window panels. Optionally, the adjacent edge portions may be spaced apart and joined by the encapsulation, or an adjacent edge portion of an outer window panel may overlap the adjacent edge portion of an inner window panel, depending on the particular application. For example, the window assembly may have an outer panel that partially surrounds or partially (or entirely) circumscribes an inner or inset panel, such as shown in FIGS. 15-17. Optionally, other patterns may be provided by a shaped outer panel that is offset and joined to one or more inner panels, such as, for example, as shown in FIGS. 18 and 19.

The pattern of the offset panels may be selected depending on the particular application and vehicle design for the vehicle to which the window assembly is to be installed. For example, the window panel configuration/arrangement may generally correspond to a design feature of the vehicle, such as the front grille of the vehicle or taillight configuration/design of the vehicle, so that the window assembly is part of the overall design features or distinguishing characteristics of the particular vehicle or vehicle manufacturer. Optionally, the encapsulation (that joins the offset panels at the interface regions) may be colored to match a color scheme of the vehicle (such as by matching or coordinating with the vehicle color or a trim or accent color of the vehicle). For example, for a red vehicle, the encapsulation may be colored red (or include a red strip along the encapsulation) and the windows may be darkened to provide an enhanced appearance of the window assembly and vehicle. Optionally, the window assembly may comprise a single inboard window panel and a formed or cut or shaped outboard window panel that is attached at the inboard window panel to provide the desired appearance or pattern, with two or more exposed surface portions of the inboard window panel being spaced apart and separated by a portion of the outboard window panel.

Figure 20:
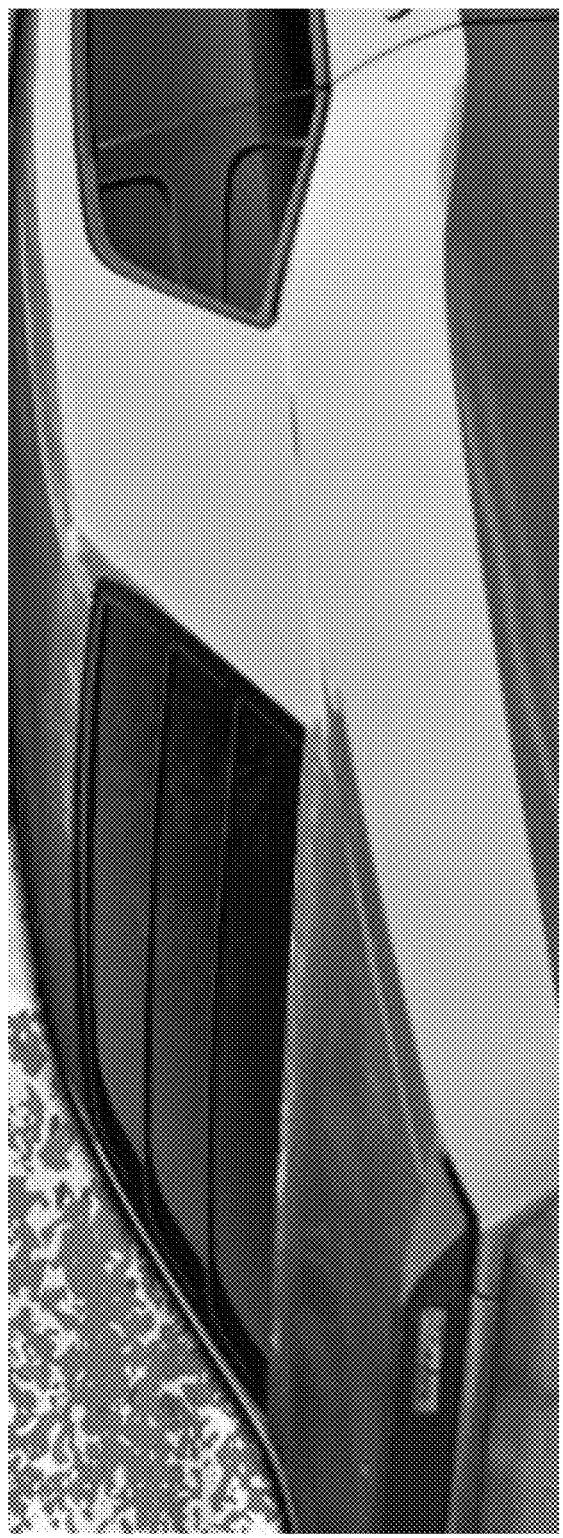
FIGS. 20-22 are perspective views of a rear backlite assembly and side window assembly of a vehicle in accordance with the present invention.
Figure 21:
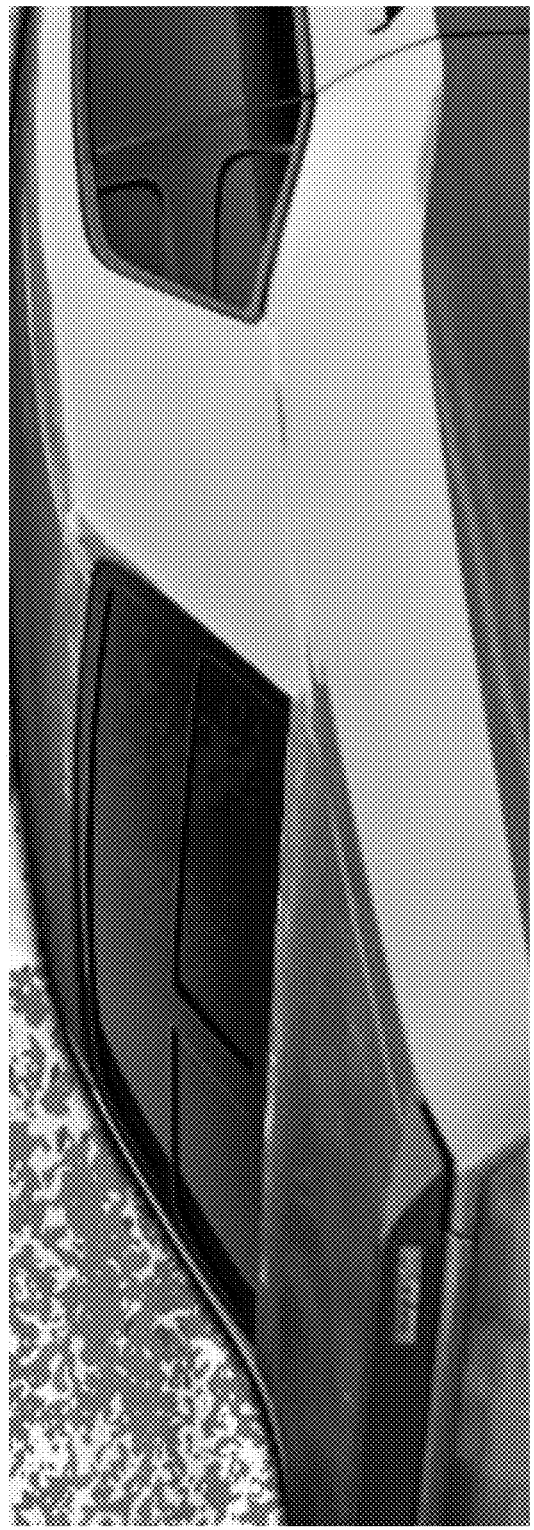
Figure 22:

Optionally, aspects of the window assemblies described above (shown for a small side rear window of a vehicle) may be utilized for a rear backlite or rear window assembly of the vehicle, such as shown in FIGS. 20-22. The pattern may generally correspond with or match the pattern of the side window assembly (such as shown in FIG. 21) or may be different from the pattern of other windows or vehicle features, depending on the particular application of the window assembly. Optionally, the molded joining element of the window panels of the rear window may be colored or patterned to enhance the appearance of the window assembly and/or to coordinate with a color scheme or design pattern or feature of the vehicle to which the window assembly is to be mounted or installed.

Optionally, the offset window panels for the window assembly of the present invention may be unitarily molded of a polycarbonate material to provide the desired appearance of the window assembly. The offset regions or interface/interfaces between the offset panels may be shaped to provide the desired appearance, and may be colored or patterned (such as via molding in a color or painting the molded window) depending on the particular application of the window assembly.

Optionally, the window assembly or assemblies of the present invention may utilize aspects of the window assemblies described in U.S. Pat. Nos. 8,881,458; 8,402,695; 5,853,895; 5,551,197; 7,073,293; 7,003,916 and/or 6,691,464, and/or U.S. Publication Nos. US-2006-0107600; US-2008-0127563; US-2004-0020131 and/or US-2003-0213179, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A window assembly for a vehicle, said window assembly comprising:
   a plurality of window panels arranged with at least one pair of adjacent window panels;
   wherein adjacent edge portions of said adjacent window panels are non-movably joined by a respective molded joining element, and wherein said molded joining element is at least partially overmolded and non-movably joined at the respective adjacent edge portions of said adjacent window panels;
   wherein said adjacent edge portions non-movably joined by the respective molded joining element are offset or non-coplanar; and
   wherein each of said adjacent window panels comprises an outer surface and an inner surface, and wherein each of said adjacent edge portions comprises an edge that spans between said outer surface and said inner surface of the respective one of said adjacent window panels, and wherein said edge of each of said adjacent edge portions is at least partially encapsulated by the respective molded joining element, and wherein said edge of each of said adjacent edge portions has a longitudinal dimension along the respective edge and a thickness dimension spanning between said outer surface and said inner surface of the respective one of said adjacent window panels, and wherein said edge of each of said adjacent edge portions is longitudinally curved (i) along the longitudinal dimension of the respective adjacent edge portion and along said molded joining element and (ii) relative to said outer surface and said inner surface of the respective one of said adjacent window panels.

2. The window assembly of claim 1, wherein said molded joining element at least partially circumscribes one of said adjacent window panels.

3. The window assembly of claim 1, wherein said molded joining element comprises a colored molded joining element.

4. The window assembly of claim 1, wherein said window panels comprise glass window panels.

5. The window assembly of claim 1, wherein said window assembly comprises a side or rear or top window of a vehicle.

6. The window assembly of claim 1, wherein said molded joining element comprises an encapsulation that at least partially receives an outer perimeter edge portion of at least one of said adjacent window panels.

7. The window assembly of claim 1, comprising a perimeter encapsulation that is established about a periphery of said window panels, wherein at least one of said window panels has an opaque film bonded at a surface thereof, and wherein said perimeter encapsulation at least partially overlaps said window panel surface and said opaque film disposed thereat.

8. The window assembly of claim 1, wherein said edges of said adjacent edge portions are parallel to one another.

9. The window assembly of claim 1, wherein said adjacent window panels comprise an outboard window panel and an inboard window panel, and wherein said outboard window panel is offset outwardly relative to said inboard window panel at least at said adjacent edge portions.

10. The window assembly of claim 9, wherein said molded joining element at least partially circumscribes said inboard window panel.

11. A window assembly for a vehicle, said window assembly comprising:
    a plurality of window panels arranged with at least one pair of adjacent window panels;
    wherein adjacent edge portions of said adjacent window panels are joined by a respective molded joining element, and wherein said molded joining element is at least partially overmolded and joined at the respective adjacent edge portions of said adjacent window panels;
    wherein said adjacent edge portions joined by the respective molded joining element are offset or non-coplanar;
    wherein said adjacent window panels comprise an outboard window panel and an inboard window panel, and wherein said outboard window panel is offset outwardly relative to said inboard window panel at least at said adjacent edge portions; and
    wherein said adjacent window panels comprise two inboard window panels and one outboard window panel, and wherein said inboard window panels are at least in part separated by a gap that is spanned by said outboard window panel, and wherein outer exposed surfaces of said inboard window panels are separated by a portion of said outboard window panel.

12. The window assembly of claim 11, wherein said adjacent edge portions are straight and parallel to one another.

13. A window assembly for a vehicle, said window assembly comprising:

a plurality of window panels arranged with at least one pair of adjacent window panels;

wherein adjacent edge portions of said adjacent window panels are non-movably joined by a respective molded joining element, and wherein said molded joining element is at least partially overmolded and non-movably joined at the respective adjacent edge portions of said adjacent window panels;

wherein said adjacent edge portions non-movably joined by the respective molded joining element are offset or non-coplanar; and wherein said adjacent window panels comprise a first window panel and a second window panel, and wherein said adjacent edge portions comprise a first perimeter edge portion of said first window panel and a second perimeter edge portion of said second window panel, and wherein said molded joining element at least partially receives said first perimeter edge portion of said first window panel, and wherein said molded joining element at least partially receives said second perimeter edge portion of said second window panel, and wherein each of said first and second window panels comprises an outer surface and an inner surface, and wherein each of said first and second perimeter edge portions comprises an edge that spans between said outer surface and said inner surface of the respective one of said first and second window panels, and wherein said edge of each of said first and second perimeter edge portions is at least partially encapsulated by said molded joining element, and wherein said edge of each of said first and second perimeter edge portions has a longitudinal dimension along the respective edge and a thickness dimension spanning between said outer surface and said inner surface of the respective one of said adjacent window panels, and wherein said edge of each of said first and second perimeter edge portions is longitudinally curved (i) along the longitudinal dimension of the respective one of said first and second perimeter edge portions and along said molded joining element and (ii) relative to said outer surface and said inner surface of the respective one of said first and second window panels.

14. The window assembly of claim 13, wherein said window assembly comprises a side window assembly of a vehicle and wherein said second window panel is disposed at least partially rearward of said first window panel.

15. The window assembly of claim 14, wherein said first perimeter edge portion comprises a rear perimeter edge portion of said first window panel and said second perimeter edge portion comprises a front perimeter edge portion of said second window panel, and wherein said molded joining element at least partially receives said rear perimeter edge portion of said first window panel and does not overlap said outer surface of said first window panel.

16. The window assembly of claim 15, wherein said outer surface of said first window panel at or near said rear perimeter edge portion is non-coplanar with said outer surface of said second window panel at or near said front perimeter edge portion.

17. The window assembly of claim 16, comprising a third window panel adjacent and rearward of said second window panel, and wherein a second molded joining element at least partially receives a rear perimeter edge portion of said second window panel and does not overlap said outer surface of said second window panel, and wherein said second molded joining element at least partially receives a front perimeter edge portion of said third window panel, and wherein said third window panel comprises an outer surface and an inner surface, and wherein each of said rear perimeter edge portion of said second window panel and said front perimeter edge portion of said third window panel comprises an edge that spans between said outer surface and said inner surface of the respective one of said second and third window panels, and wherein said edge of each of said rear perimeter edge portion of said second window panel and said front perimeter edge portion of said third window panel is at least partially encapsulated by said second molded joining element, and wherein said edge of each of said rear perimeter edge portion of said second window panel and said front perimeter edge portion of said third window panel has a longitudinal dimension along the respective edge and a thickness dimension spanning between said outer surface and said inner surface of the respective one of said second and third window panels, and wherein said edge of each of said rear perimeter edge portion of said second window panel and said front perimeter edge portion of said third window panel is longitudinally curved (i) along the longitudinal dimension of the respective one of said rear perimeter edge portion of said second window panel and said front perimeter edge portion of said third window panel and along said second molded joining element and (ii) relative to said outer surface and said inner surface of the respective one of said second and third window panels, and wherein said outer surface of said third window panel at or near said front perimeter edge portion of said third window panel is non-coplanar with said outer surface of said second window panel at or near said rear perimeter edge portion of said second window panel.

18. The window assembly of claim 17, comprising a perimeter encapsulation that is established about a periphery of said window panels.

19. The window assembly of claim 18, wherein said perimeter encapsulation partially receives an outer perimeter edge portion of each of said first, second and third window panels and does not overlap said outer surfaces of said first, second and third window panels.

20. A window assembly for a vehicle, said window assembly comprising:

a plurality of window panels comprising a first window panel, a second window panel adjacent said first window panel and a third window panel adjacent said second window panel;

wherein first adjacent edge portions of said first and second window panels are non-movably joined by a first molded joining element, and wherein said first molded joining element is at least partially overmolded and non-movably joined at the respective first adjacent edge portions of said first and second window panels;

wherein second adjacent edge portions of said second and third window panels are non-movably joined by a second molded joining element, and wherein said second molded joining element is at least partially overmolded and non-movably joined at the respective second adjacent edge portions of said second and third window panels;

wherein said adjacent edge portions non-movably joined by the respective molded joining element are offset or non-coplanar;

wherein said window assembly comprises a side window assembly of a vehicle, and wherein said second window panel is disposed at least partially rearward of said first window panel and said third window panel is disposed at least partially rearward of said second window panel; and wherein said first adjacent edge portions comprise a rear perimeter edge portion of said first window panel and a front perimeter edge portion of said second window panel, and wherein said first molded joining element at least partially receives said rear perimeter edge portion of said first window panel and does not overlap an outer surface of said first window panel, and wherein said first molded joining element at least partially receives said front perimeter edge portion of said second window panel, and wherein said second adjacent edge portions comprise a rear perimeter edge portion of said second window panel and a front perimeter edge portion of said third window panel, and wherein said second molded joining element at least partially receives said rear perimeter edge portion of said second window panel and does not overlap an outer surface of said second window panel, and wherein said second molded joining element at least partially receives said front perimeter edge portion of said third window panel.

21. The window assembly of claim 20, comprising a perimeter encapsulation that is established about a periphery of at least some of said first, second and third window panels.

22. The window assembly of claim 20, wherein said first window panel comprises an inboard window panel and said second window panel comprises an outboard window panel, and wherein said outboard window panel is offset outwardly from the vehicle relative to said inboard window panel at least at said adjacent edge portions.

23. A window assembly for a vehicle, said window assembly comprising:

a plurality of window panels comprising a first window panel, a second window panel adjacent said first window panel and a third window panel adjacent said second window panel;

wherein first adjacent edge portions of said first and second window panels are joined by a first molded joining element, and wherein said first molded joining element is at least partially overmolded and joined at the respective first adjacent edge portions of said first and second window panels;

wherein second adjacent edge portions of said second and third window panels are joined by a second molded joining element, and wherein said second molded joining element is at least partially overmolded and joined at the respective second adjacent edge portions of said second and third window panels;

wherein said adjacent edge portions joined by the respective molded joining element are offset or non-coplanar;

wherein said first window panel comprises an inboard window panel and said second window panel comprises an outboard window panel, and wherein said outboard window panel is offset outwardly from the vehicle relative to said inboard window panel at least at said adjacent edge portions; and wherein said third window panel comprises another inboard window panel, and wherein said first and third window panels are at least in part separated by a gap that is spanned by said second window panel, and wherein outer exposed surfaces of said first and third window panels are separated by a portion of said second window panel.

24. A window assembly for a vehicle, said window assembly comprising:

a plurality of window panels comprising a first window panel, a second window panel adjacent said first window panel and a third window panel adjacent said second window panel;

wherein first adjacent edge portions of said first and second window panels are non-movably joined by a first molded joining element, and wherein said first molded joining element is at least partially overmolded and non-movably joined at the respective first adjacent edge portions of said first and second window panels;

wherein second adjacent edge portions of said second and third window panels are non-movably joined by a second molded joining element, and wherein said second molded joining element is at least partially overmolded and non-movably joined at the respective second adjacent edge portions of said second and third window panels;

wherein said adjacent edge portions non-movably joined by the respective molded joining element are offset or non-coplanar; and wherein each of said first, second and third window panels comprises an outer surface and an inner surface, and wherein each of said first and second adjacent edge portions comprises an edge that spans between said outer surface and said inner surface of the respective one of said first, second and third window panels, and wherein said edge of each edge portion of said first adjacent edge portions is at least partially encapsulated by said first molded joining element, and wherein said edge of each edge portion of said first adjacent edge portions has a longitudinal dimension along the respective edge and a thickness dimension spanning between said outer surface and said inner surface of the respective one of said first, second and third window panels, and wherein said edge of each edge portion of said first adjacent edge portions is longitudinally curved (i) along the longitudinal dimension of the respective edge portion of said first adjacent edge portions and along said first molded joining element and (ii) relative to said outer surface and said inner surface of the respective one of said first and second window panels.

25. The window assembly of claim 24, wherein said edge of each edge portion of said second adjacent edge portions is at least partially encapsulated by said second molded joining element, and wherein said edge of each edge portion of said second adjacent edge portions has a longitudinal dimension along the respective edge and a thickness dimension spanning between said outer surface and said inner surface of the respective one of said first, second and third window panels, and wherein said edge of each edge portion of said second adjacent edge portions is longitudinally curved (i) along the longitudinal dimension of the respective edge portion of said second adjacent edge portions and along said second molded joining element and (ii) relative to said outer surface and said inner surface of the respective one of said second and third window panels.

26. The window assembly of claim 25, wherein a first curvature of said edge of each edge portion of said first adjacent edge portions along said first molded joining element is different than a second curvature of said edge of each edge portion of said second adjacent edge portions along said second molded joining element.

\* \* \* \* \*